(12) United States Patent
Helander et al.

(10) Patent No.: US 10,547,220 B2
(45) Date of Patent: Jan. 28, 2020

(54) ELECTRIC MACHINE

(71) Applicant: ABB Schweiz AG, Baden (CH)

(72) Inventors: Joonas Helander, Helsinki (FI);
Moritz Grün, Espoo (FI); Ilkka Vainio, Helsinki (FI)

(73) Assignee: ABB Schweiz AG, Baden (CH)

( * ) Notice: Subject to any disclaimer, the term of this patent is extended or adjusted under 35 U.S.C. 154(b) by 240 days.

(21) Appl. No.: 15/559,128

(22) PCT Filed: Mar. 11, 2016

(86) PCT No.: PCT/EP2016/055309
§ 371 (c)(1),
(2) Date: Sep. 18, 2017

(87) PCT Pub. No.: WO2016/146530
PCT Pub. Date: Sep. 22, 2016

(65) Prior Publication Data
US 2018/0248422 A1 Aug. 30, 2018

(30) Foreign Application Priority Data
Mar. 16, 2015 (EP) ..................................... 15159124

(51) Int. Cl.
*H02K 1/18* (2006.01)
*F02B 63/04* (2006.01)
(Continued)

(52) U.S. Cl.
CPC ........... *H02K 1/185* (2013.01); *F02B 63/042* (2013.01); *H02K 5/161* (2013.01); *H02K 7/083* (2013.01); *H02K 7/1815* (2013.01); *F02B 3/06* (2013.01)

(58) Field of Classification Search
CPC .......... H02K 1/185; H02K 5/00; H02K 5/161; H02K 7/083; H02K 7/1815; H02K 7/1823
See application file for complete search history.

(56) References Cited

U.S. PATENT DOCUMENTS

| 5,744,885 A | 4/1998 | Keck et al. |
| 2004/0083278 A1 | 4/2004 | Becherer |
| (Continued) | | |

FOREIGN PATENT DOCUMENTS

| DE | 2124894 A1 | 11/1972 |
| DE | 3506628 A1 | 8/1986 |
| (Continued) | | |

OTHER PUBLICATIONS

International Search Report and Written Opinion, PCT/EP2016/054464, dated May 27, 2016, ABB Technology AG, 10 pages.
(Continued)

*Primary Examiner* — Jue Zhang
*Assistant Examiner* — Bart Iliya
(74) *Attorney, Agent, or Firm* — Taft Stettinius & Hollister LLP; J. Bruce Schelkopf (57) ABSTRACT

The electric machine comprises a rotor, a stator and a support structure. The stator comprises a stator core and a stator frame. The stator frame has axial (X-X) ends and longitudinal sides. The rotor is supported with bearings on the support structure. An end support structure of cast iron is provided at each end of the stator frame. The end support structure is formed of a longitudinal middle portion and two upwards directed end portions. The end support structure extends in a traverse direction between outer edges of the axial (X-X) end of the stator frame. The end support structure is attached with compression joints to the support structure and to the axial (X-X) end of the stator frame.

20 Claims, 7 Drawing Sheets

(51) Int. Cl.
*H02K 7/18* (2006.01)
*H02K 5/16* (2006.01)
*H02K 7/08* (2006.01)
*F02B 3/06* (2006.01)

(56) References Cited

U.S. PATENT DOCUMENTS

| | | | |
|---|---|---|---|
| 2005/0163118 A1 | 7/2005 | Steindl | |
| 2013/0275566 A1 | 10/2013 | Huth et al. | |
| 2017/0012487 A1* | 1/2017 | Brandl | H02K 1/185 |
| 2017/0250582 A1* | 8/2017 | Kanakamedala | H02K 1/185 |
| 2018/0041092 A1* | 2/2018 | Ourion | H02K 1/185 |
| 2018/0175697 A1* | 6/2018 | Helander | H02K 1/185 |
| 2018/0198328 A1* | 7/2018 | Helander | H02K 1/185 |

FOREIGN PATENT DOCUMENTS

| | | | |
|---|---|---|---|
| EP | 0057294 A1 | 8/1982 | |
| WO | 0150711 A1 | 7/2001 | |
| WO | 2013057666 A1 | 4/2013 | |

OTHER PUBLICATIONS

European Search Report, EP 15159124, dated Sep. 8, 2015, ABB Technology AG, 2 pages.

\* cited by examiner

ELECTRIC MACHINE

FIELD OF THE INVENTION

The invention relates to an electric machine.

Electric machines i.e. electric motors and electric generators are used in many applications. Electric motors are used to drive different kinds of machines and electric generators are used to produce electric power. The power sources used to drive electric generators vary. Steam is one common power source used in electric power plants to drive turbines, whereby the turbines drive the electric generators. Combustion engines can on the other hand be used to drive generators. The combustion engine and the generator are often mounted on a common platform forming a support structure. The whole unit comprising the combustion engine and the electric generator on the common support structure can then be transported to the site and positioned on the floor in the power building. The installation of such a unit is thus very fast.

The stator in an electric generator comprises normally an annular stator core and a stator frame surrounding the stator core. The inner surface of the stator core comprises slots opening into the inner surface of the annular stator core. The stator winding is positioned in the slots. There are further back beams extending in the axial direction along the outer surface of the stator core. The back beams are welded to the outer surface of the stator core. The stator frame comprises normally end constructions and frame plates between the end constructions. The stator frame can be manufactured simultaneously with the stator core. The stator frame can then be installed on the stator core when the stator core is ready. The stator core is attached via the back beams to the stator frame. The stator frame is attached with support elements to the support structure.

Especially electric generators positioned on a common support structure with a combustion engine, which drives the electric generator, are during the lifespan of the electric generator subjected to heavy vibrations originating from the combustion engine. The number of load cycles during the lifespan of the electric generator can exceed $10^9$. These vibrations cause fluctuating stresses on the frame constructions of the electric generator and on the attachments within the frame constructions of the electric generator as well as on the attachments between the frame constructions of the electric generator and the support structure.

BRIEF DESCRIPTION OF THE INVENTION

An object of the present invention is to achieve an improved electric machine.

The electric machine according to the invention is defined in claim 1.

The electric machine comprises a cylindrical rotor being rotatable around a longitudinal centre axis of rotation, a stator surrounding the rotor and a support structure supporting the rotor and the stator, the stator comprising a cylindrical stator core and a stator frame surrounding the stator core, the stator core being attached to the stator frame, the stator frame having axial ends and longitudinal sides, the rotor being supported at each axial end through a bearing located in a bearing house on the support structure, the bearing house being located axially outwardly from the axial end of the stator frame.

The electric machine is characterized in that an end support structure of cast iron having a length and a height is provided at each axial end of the stator frame, the end support structure being formed of a longitudinal middle portion and two upwards to the height of the end support structure directed end portions, the end support structure extending in an axially traverse direction between the outer edges of the axial ends of the stator frame, whereby the end support structure is attached with compression joints to the axial end of the stator frame and to the support structure, the bearing house being supported on and attached to the middle portion of the end support structure.

The use of the end support structure will increase the stiffness of the whole frame construction of the electric machine. The end support structure is attached with compression joints to the support structure and with compression joints to the axial end of the stator frame. The compression joints can be realized with bolts and nuts. The end support structure can, due to the upwards extending end portions, be attached from a large area to the end of the stator frame. The middle portion and the end portions of the end support structure can comprise fastening points to the support structure and fastening points to the axial end of the stator frame. This attachment from a large area eliminates tension concentrations in the end support structure and in the axial end of the stator frame.

The end support structures at each end of the stator frame will increase the stiffness of the whole frame construction so that the frame construction can withstand the required number of load cycles of $10^9$ without braking during the lifetime of the electric machine. The end support construction will distribute the stresses more evenly into the frame construction, whereby significant stress concentrations are avoided.

The use of cast iron makes it possible to achieve any suitable form for the end support structure rather easily. The form of the end support structure can thus be optimized so that stress concentrations are eliminated. The slopes of the SN-curves for cast iron are also very gentle compared to the corresponding slopes of welded structures. The fatigue resistance is in case of high or very high alternating stresses much higher for cast iron compared to the fatigue resistance for welded structures. The end support could be made of GJS-400 cast iron.

The end support structure can in an advantageous embodiment be formed so that the height of the end portions of the end support structure is in the range of 20 to 50% of the length of the end support structure. A sufficient height of the end portions makes it possible to have fastening points from the end support structure to the end of the stator frame at a sufficient level above the surface of the support structure.

The end support structure can in another advantageous embodiment be formed so that each end portion of the end support structure comprises a recess extending from the bottom surface of the end portion upwards. This arrangement will reduce the stress concentration in the lower area of the end portion. The lower area of the end portions is the area where the stress concentration would otherwise be the highest.

The end support structure can in a further advantageous embodiment be formed so that transition sections between the middle portion and the end portions have a curved form so that the curve increases towards to end portion. The idea here is to distribute stresses evenly along the whole end support structure.

The end support structure can in a further advantageous embodiment be formed so that the end support structure comprises a flange extending in the front edge of the support structure between the end portions of the end support structure, whereby the flange has a straight middle part and curved end parts starting from the upper ends of the end portions of the end support structure. The flange will stiffen the end support structure.

The stator core can in a further advantageous embodiment be attached to the stator frame with L-shaped brackets, whereby one branch of the bracket can be attached with a compression joint to the back beam on the stator core and the other branch of the bracket can be attached with a compression joint to the stator frame. The compression joints can be realized with bolts and nuts. Such an arrangement will eliminate the need for welded joints in the attachment between the stator core and the stator frame.

The stator frame can in a further advantageous embodiment be attached with support elements to the support structure at the axially traverse outer edges of the stator frame. The support elements can be attached with a compression joint to the stator frame and with a compression joint to the support structure. The support elements can be made of cast iron. The compression joints can be realized with bolts and nuts. Such an arrangement will eliminate the need for welded joints in the attachment between the stator frame and the support structure.

Support elements made of cast iron and fastening means based on compression joints e.g. achieved with bolts and nuts can easily withstand the number of $10^9$ load cycles during the lifetime of the electric machine.

The use of cast iron makes it possible to achieve any suitable form for the support elements rather easily. The form of the support elements can thus be optimized so that stress concentrations are eliminated. The slopes of the SN-curves for cast iron are also very gentle compared to the corresponding slopes of welded structures. The fatigue resistance is in case of high or very high alternating stresses much higher for cast iron compared to the fatigue resistance for welded structures.

The invention is especially suitable to be used in big electric machines having a shaft height of at least 1 m.

BRIEF DESCRIPTION OF THE DRAWINGS

In the following the invention will be described in greater detail by means of preferred embodiments with reference to the attached drawings, in which.

DETAILED DESCRIPTION OF EMBODIMENTS OF THE INVENTION

Figure 1:
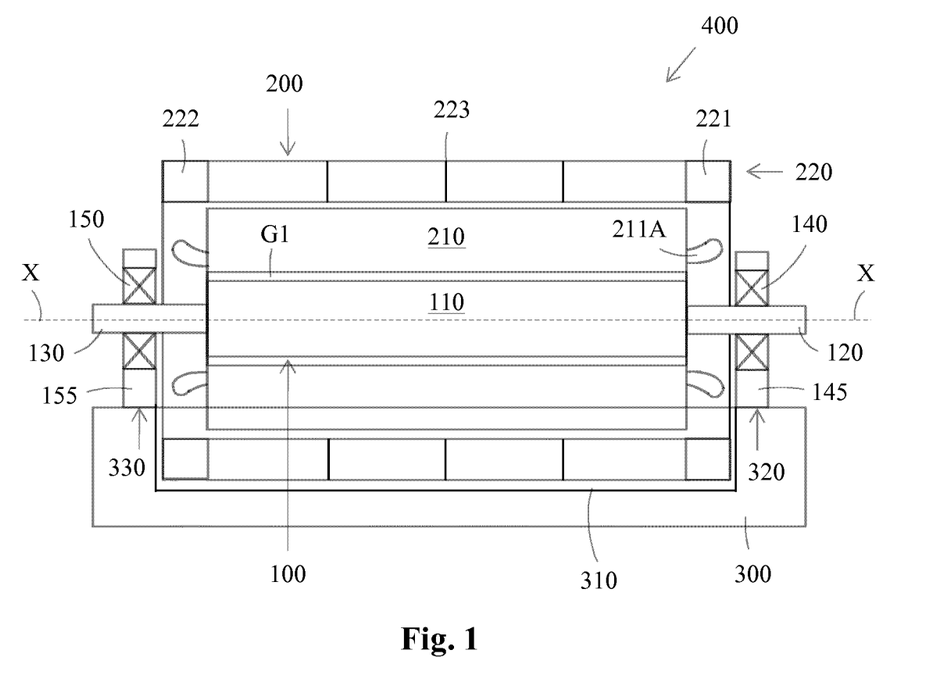
FIG. 1 shows a longitudinal cross section of an electric machine.

FIG. 1 shows a longitudinal cross section of an electric machine. The electric machine 400 comprises a longitudinal centre axis X-X, a cylindrical rotor 100 and a cylindrical stator 200 surrounding the rotor 100.

The rotor 100 comprises a centre portion 110 provided with a rotor winding (not shown in the figure) and two end portions 120, 130 at each axial X-X end of the centre portion 110. Each end portion 120, 130 of the rotor 100 is rotatably supported on a bearing 140, 150 provided in a bearing house 145, 155, which is supported on a support structure 300 of the electric machine 400. Each bearing house 145, 155 is supported on a respective end support surface 320, 330 of the support structure 300.

The stator 200 comprises a stator core 210 and a stator frame 220 surrounding the stator core 210. The stator frame 220 comprises two opposite end constructions 221, 222 located at an axial X-X distance from each other. The stator frame 220 comprises further stator plates 223 located between the end constructions 221, 222. The stator plates 223 are located at an axial X-X distance from each other along the centre axis X-X of the electric machine 400. The stator core 210 is attached to the stator frame 220 and the stator frame 220 is supported on the support structure 300. The stator core 210 is further provided with a stator winding. The figure shows only the winding ends 211A of the stator winding. The support structure 300 comprises further a recessed portion 310 between the end support surfaces 320, 330. The recessed portion 310 receives a lower portion of the stator 200.

There is an air gap G1 between the outer surface of the middle portion 110 of the rotor 100 and the inner surface of the stator core 210.

The electric machine 400 can be an electric motor or an electric generator.

Figure 2:
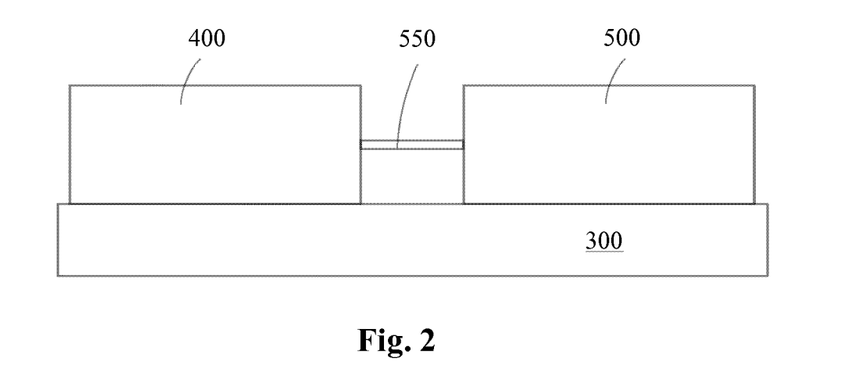
FIG. 2 shows an electric generator and a diesel engine mounted on a common support structure.

FIG. 2 shows an electric generator and a combustion engine mounted on a common support structure. The electric generator 400 is mounted on a common support structure 300 with a combustion engine 500. The combustion engine 500 drives the electric generator 400 through a shaft 550.

Figure 3:
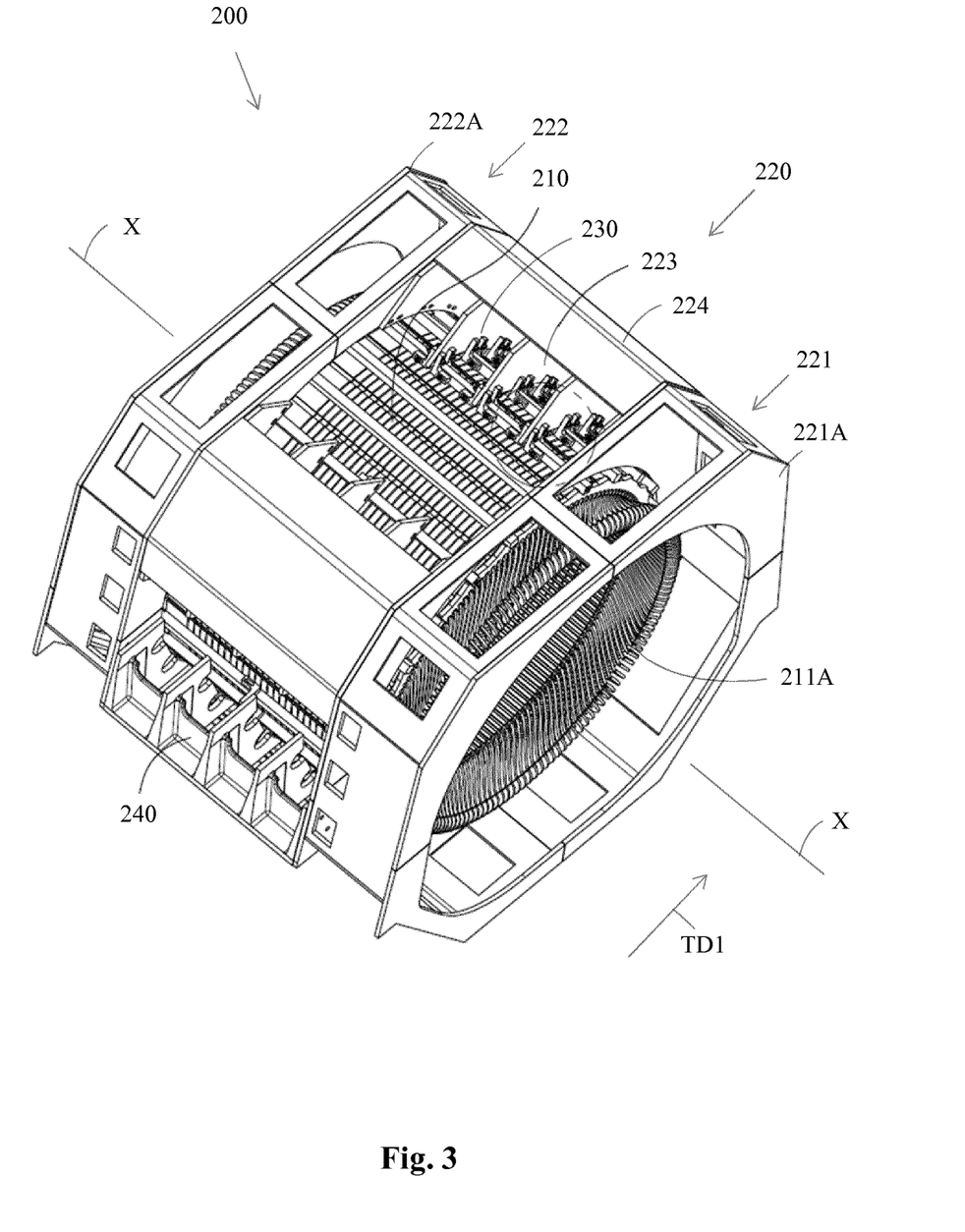
FIG. 3 shows an axonometric view of a stator.
Figure 4:
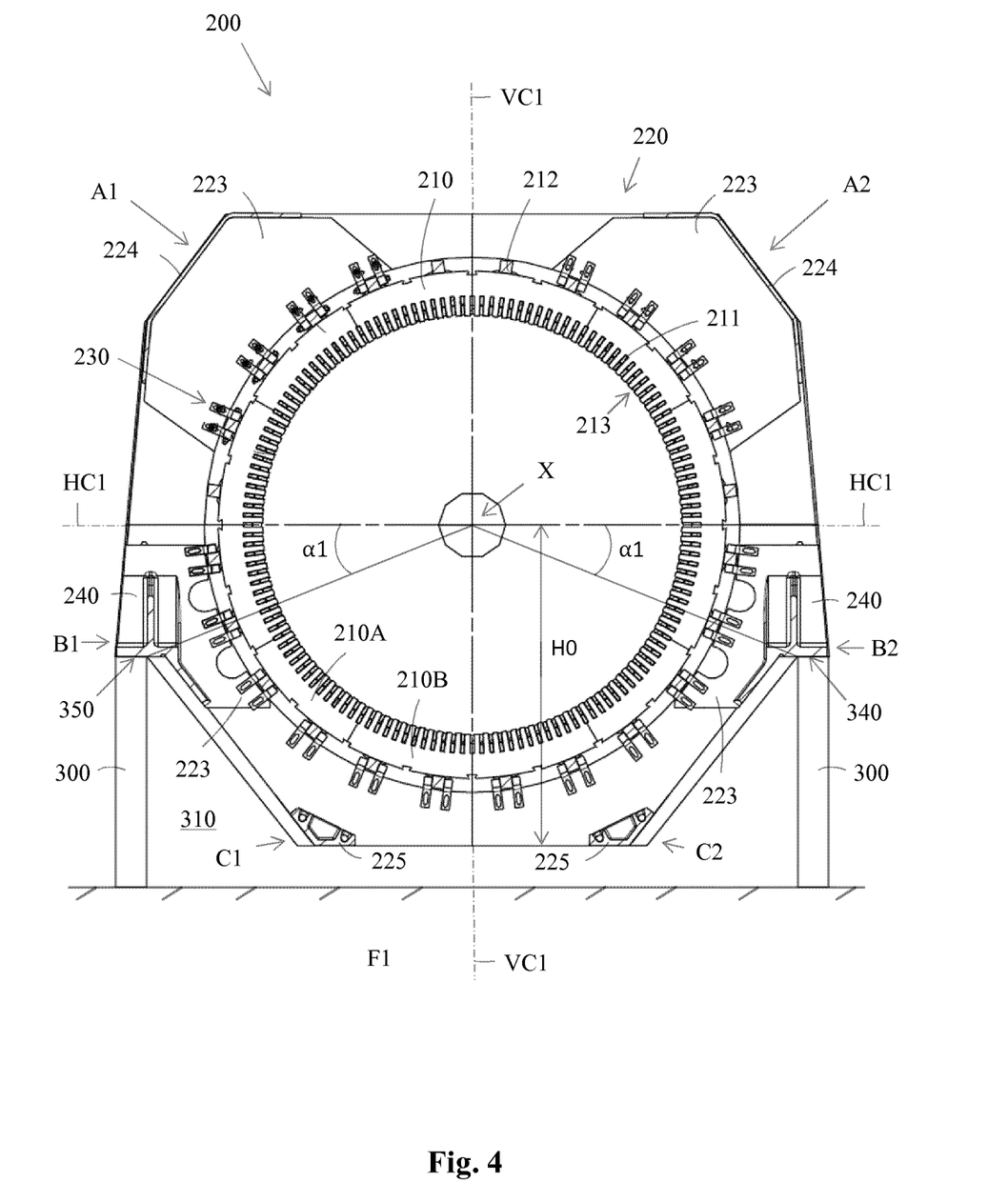
FIG. 4 shows a traverse cross section of the stator.
Figure 5:
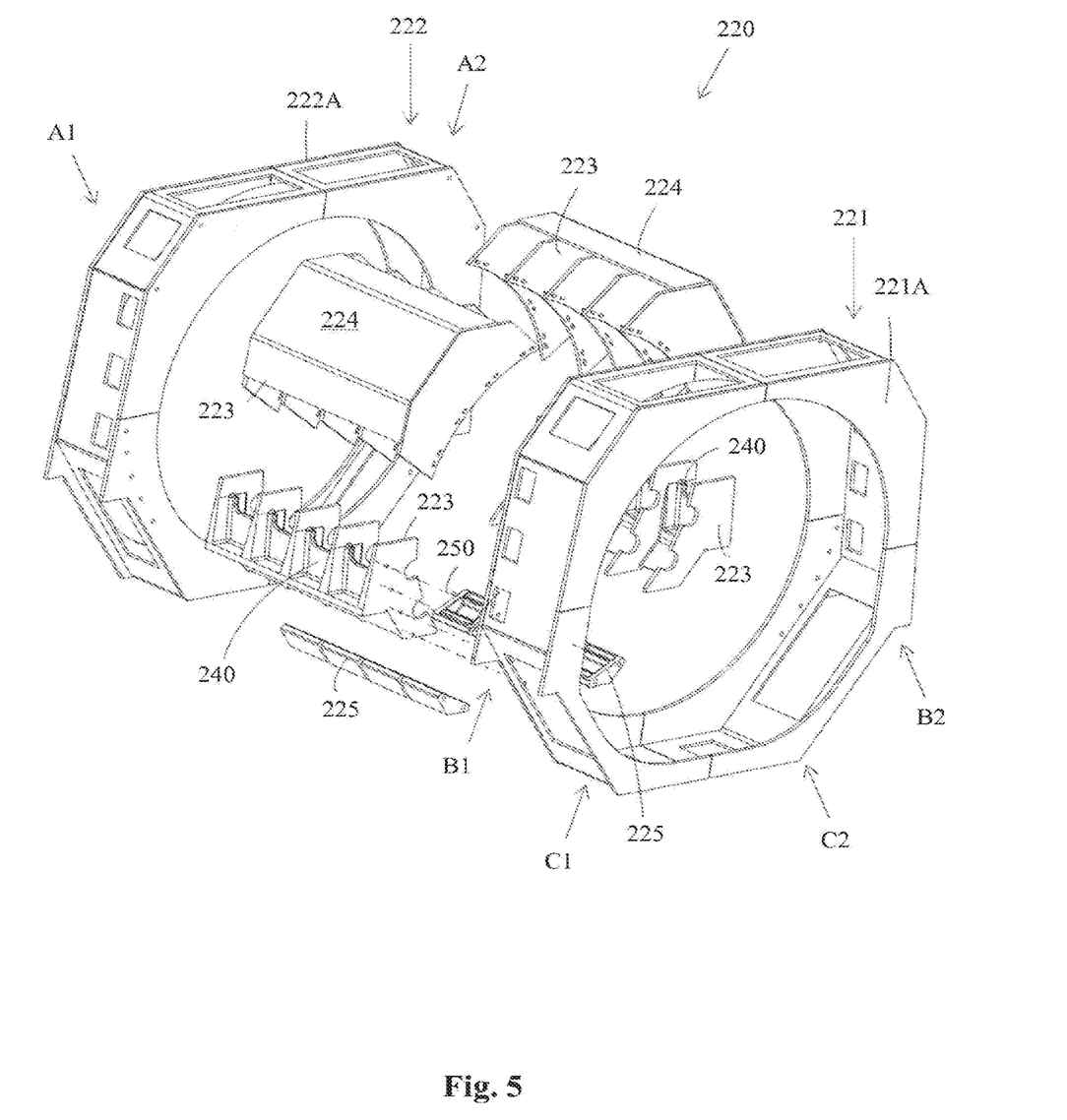
FIG. 5 shows an exploded view of the stator frame.

FIG. 3 shows an axonometric view of the stator, FIG. 4 shows a traverse cross section of the stator and FIG. 5 shows an exploded view of the stator frame of the electric machine shown in FIG. 1.

FIG. 4 shows the shaft height H0 of the electric machine. The shaft height H0 is measured from the centre axis of rotation X-X to the lowermost edge of the stator frame 220. The invention is especially suitable to be used in big electric machines having a shaft height H0 of at least 1 m.

The stator 200 has a longitudinal centre axis X-X coinciding with the longitudinal centre axis X-X of the electric machine 400. The cross section of the stator 200 has a vertical centre line VC1 and a horizontal centre line HC1. The stator 200 has further a transverse direction TD1 being perpendicular to direction of the longitudinal centre axis X-X. The stator 200 comprises a stator core 210 and a stator frame 220 surrounding the stator core 210.

The stator core 210 comprises slots 213 penetrating into the stator core 210 from the inner perimeter of the stator core 210. The slots 213 in the stator core 210 receive a stator winding 211. The stator core 210 has a laminated structure i.e. it is composed of annular sheets that are stacked together to form the stator core 210. Each sheet in the stator core 210 is made of sectors 210A, 210B, whereby the sectors 210A, 210B are attached to each other in order to form a closed perimeter. The stator core 210 comprises further back beams 212 attached to the outer surface of the stator core 210 and extending in the axial X-X direction of the stator 200. The stator core 210 has a cylindrical form.

The stator frame 220 comprises longitudinal sides and axial ends. The stator frame 220 comprises two opposite end constructions 221, 222 located at an axial X-X distance from each other. Each end construction 221, 222 comprises an end plate 221A, 222A being positioned outermost in the axial X-X direction. The end plates 221A, 222A of the end constructions 221, 222 form axial X-X ends of the stator frame 220. The stator frame 220 comprises further frame plates 223 between the end constructions 221, 222. Each frame plate 223 is formed of four separate sectors 223. Two sectors of frame plates 223 are positioned symmetrically at both sides of the vertical centre line VC1 in the upper corners A1, A2 of the stator frame 220. Two sectors of frame plates 223 are positioned symmetrically on both sides of the vertical centre line VC1 in the lower corners B1, B2 of the stator frame 220. The two sectors of frame plates 223 in the upper corners A1, A2 of the stator frame 220 are connected to each other with a connection part 224. Each connection part 224 extends along the outer perimeter of the respective frame plate 223. The connection part 224 and the frame plates 223 form a frame plate package.

The stator frame 220 comprises further a package of first intermediate parts 225 located symmetrically at opposite sides of the vertical centre plane VC1 in both lowermost corners C1, C2 of the stator frame 220.

The stator 200 is supported from the longitudinal sides with support elements 240 on the side support surfaces 340, 350 of the support construction 300 of the electric machine. The support construction 300 is supported on the floor F1 on the site. The support elements 240 are located symmetrically at both longitudinal sides of the vertical centre line VC1 in the lower corners B1, B2 of the stator frame 220. A frame plate 223 is attached to each vertical side surface of each support element 240. The support elements 240 are located symmetrically at the outer edges of the longitudinal sides of the stator frame 220. The support elements 240 are in this embodiment located entirely below the horizontal centre plane HC1-HC1 of the stator 200. A portion of the support elements 240 could naturally be located above the horizontal centre plane HC1-HC1. The side support surfaces 340, 350 of the support elements 240 are advantageously located at an angle α1 below the horizontal centre plane HC1-HC1 of the stator 200. The angle α1 is advantageously in the range 10 to 45 degrees. The support elements 240 and the frame plates 223 between the support elements 240 form a support element package. The support element package can be formed as one entity. The support elements 240 can be attached to the support construction 300 with fastening means producing a compression joint e.g. bolts and nuts. The support elements 240 can on the other hand be attached to the stator frame 220 also with fastening means producing a compression joint e.g. bolts and nuts.

The recess 310 in the support structure 300 is formed in the area between the side support surfaces 340, 350 and the end support surfaces 320, 330 of the support structure 300. The side support surfaces 340, 350 and the end support surfaces 320, 330 of the support structure 300 are advantageously positioned on the same horizontal level. The side support surfaces 340, 350 and the end support surfaces 320, 330 could naturally be positioned on different horizontal levels if needed.

The axial X-X ends of the frame plate packages 223, 224 and the axial X-X ends of the support element packages 240, 223 as well as the axial X-X ends of the packages of the first intermediate parts 225 are attached to a respective end construction 221, 222 with fastening means 250 e.g. with bolts and nuts. The inner perimeter of the transverse cross section of the stator frame 220 has a circular form. The outer perimeter of the transverse cross section of the stator frame 220 has a polygonal form.

The stator core 210 and the stator frame 220 can thus be manufactured independently simultaneously. The annular sheets of the stator core 210 are assembled to form the complete stator core 210 and then the stator winding 211 is wound into the slots 213 in the stator core 210. The end constructions 221, 222, the frame plates 223, the support elements 240 and the first intermediate parts 225 are assembled to form the complete stator frame 220. The stator core 210 is then attached to the stator frame 220. This can be done e.g. by L-shaped brackets 230. One branch of the brackets 230 is fastened with compression joints to the back beams 212 and the other branch is fastened with compression joints to the frame plates 223. The compression joints in both branches can be achieved e.g. with bolts and nuts. Another possibility would be to use C-clamps on the back beams 212 and attach the C-clamps by welding to the back beams 212 and the frame plates 223.

Figure 6:
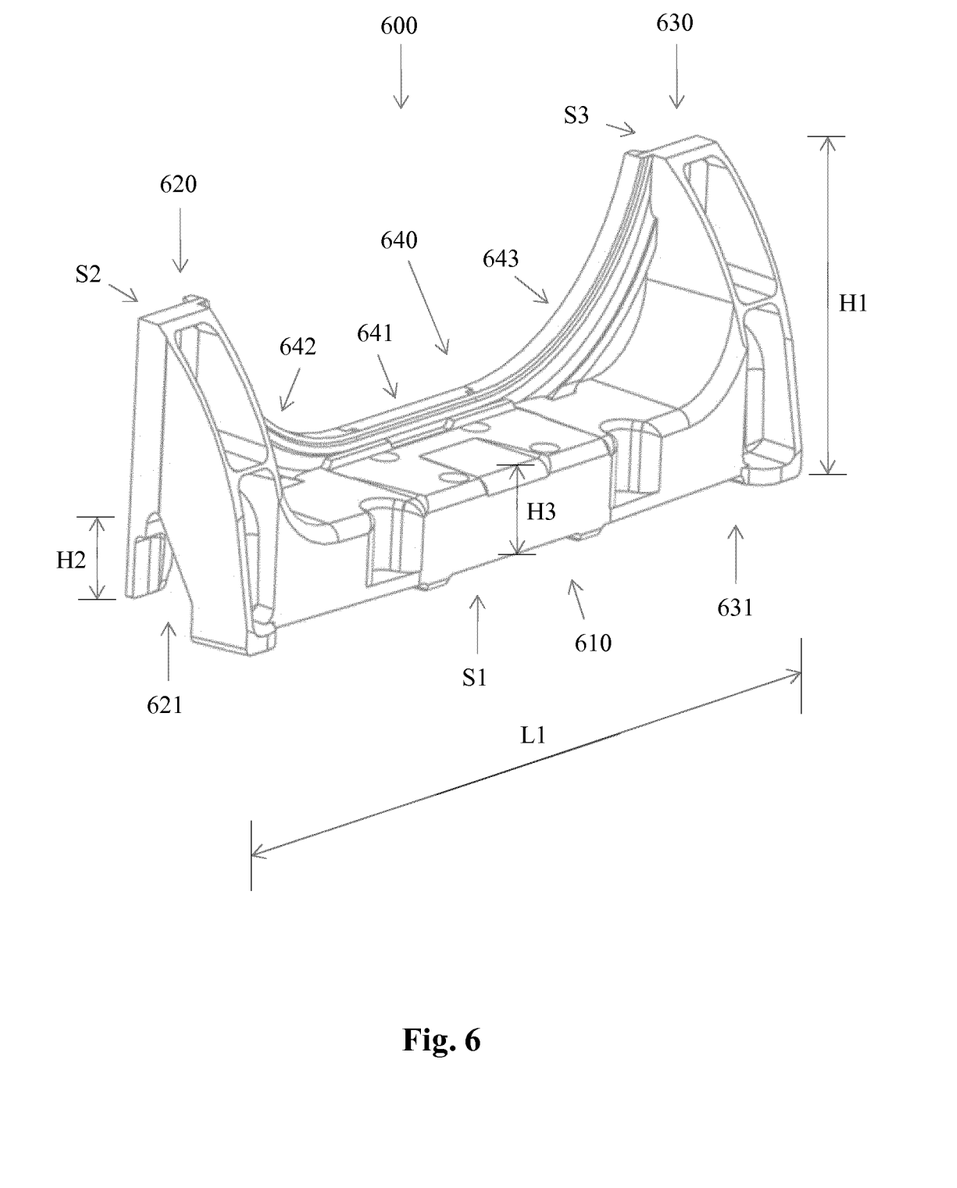
FIG. 6 shows an axonometric view of a first embodiment of an end support structure according to the invention.

FIG. 6 shows an axonometric view of a first embodiment of an end support structure according to the invention. The end support structure 600 has a length L1 and a height H1. The end support structure 600 is formed of a longitudinal middle portion 610 and an upwards along the height H1 directed end portion 620, 630 at each end of the middle portion 610. The transition between the middle portion 610 and each end portion 620, 630 is curved. The starting point of the curve at the middle portion is on a lower level compared to the end point of the curve at the end portion. The middle portion 610 and the end portions 620, 630 comprises a first support surface S1, which will be positioned against the upper surface of the support structure 300. Each end portion 620, 630 comprises a second support surface S2, S3, which will be positioned against the axially X-X outer end plate 221A, 222A in the respective end construction 221, 222 in the stator frame 220. The first support surface S1 is perpendicular to the second support surface S2, S3. The end portions 620, 630 are mirror images of each other. The end support structure 600 extends in an axially X-X traverse direction TD1 between the outer edges of the stator frame 220. The height H1 is in the range of 20 to 50% of the length L1 of the end support structure 600. The length L1 of the end support structure 600 is determined by the width of the stator frame 220 between the outer edges of the stator frame 220. The height H3 of the centre portion 610 of the end support structure 600 is in the range of 20 to 60% of the height H1 of the end portions 620, 630 of the end support structure 600.

The end support structure 600 comprises further a flange 640 extending in the front edge of the support structure 600 between the end portions 620, 630 of the end support structure 600. The flange 640 has a straight middle part 641 and curved end parts 642, 643 starting from the upper ends of the end portions 620, 630 of the end support structure 600. The flange 640 stiffens the end support structure 600 further.

Each end portion 620, 630 of the end support structure 600 has a recess 621, 631 extending from the first support surface S1 at the bottom of the end portion 620, 630 upwards. The height H2 of the recess 621, 631 is in the range of 20 to 40% of the height H1 of the end portion 620, 630. The idea with the recess 621, 631 is to reduce the stress concentration in the lower area of the end portion 620, 630. The result is a more uniform stress distribution through the whole end portion 620, 630. The recess 621, 631 increases the resilience in the lower part of the end portion 620, 630. The increase in resilience can be achieved also by using a smaller material thickness in the lower part of the end portion 620, 630 compared to the material thickness of the upper part of the end portion 620, 630. It is, however, easier to construct the casting mould so that a recess is achieved in the end support construction 600.

The middle portion 610 of the end support structure 600 extends in an axially X-X traverse direction TD1 of the electric machine along the end support surface 320, 330 of the support structure 300 under the bearing house 145, 155. The bearing house 145, 155 is thus attached to the middle portion 610 of the end support structure 600. The end support structure 600 can be attached from the middle portion 610 and from the end portions 620, 630 to the end support surface 320, 330 of the support structure 300. The end support structure 600 can further be attached from the middle portion 610 and from the end portions 620, 630 to the end plate 221A, 222A of the end construction 221, 222 of the stator frame 200. The support surface S2, S3 of each end portion 620, 630 seats against the end plate 221A, 222A of the end construction 221, 222 of the stator frame 220.

The end support structure 600 will increase the stiffness of the stator frame 220 considerably. The stator frame 220 can as in prior art solutions be firstly attached with the support elements 240 at the side support surfaces 340, 350 of the support structure 300. The side support surfaces 340, 350 of the support structure 300 are located at longitudinal sides of the stator frame 220 at the axial X-X middle point of the stator frame 220. The stator frame 220 will secondly be attached with the end support structures 600 at the end support surfaces 320, 330 of the support structure 300. The end support surfaces 320, 330 are located at the axial X-X ends of the stator frame 220. The support points of the end portions 620, 630 of the end support structures 600 at the end plates 221A, 222A of the stator frame 220 will be located symmetrically at axially X-X traverse outer edges of the stator frame 220 on the same longitudinal line as the support elements 240 are. Said longitudinal line is parallel with the centre axis X-X of the electric machine.

Figure 7:
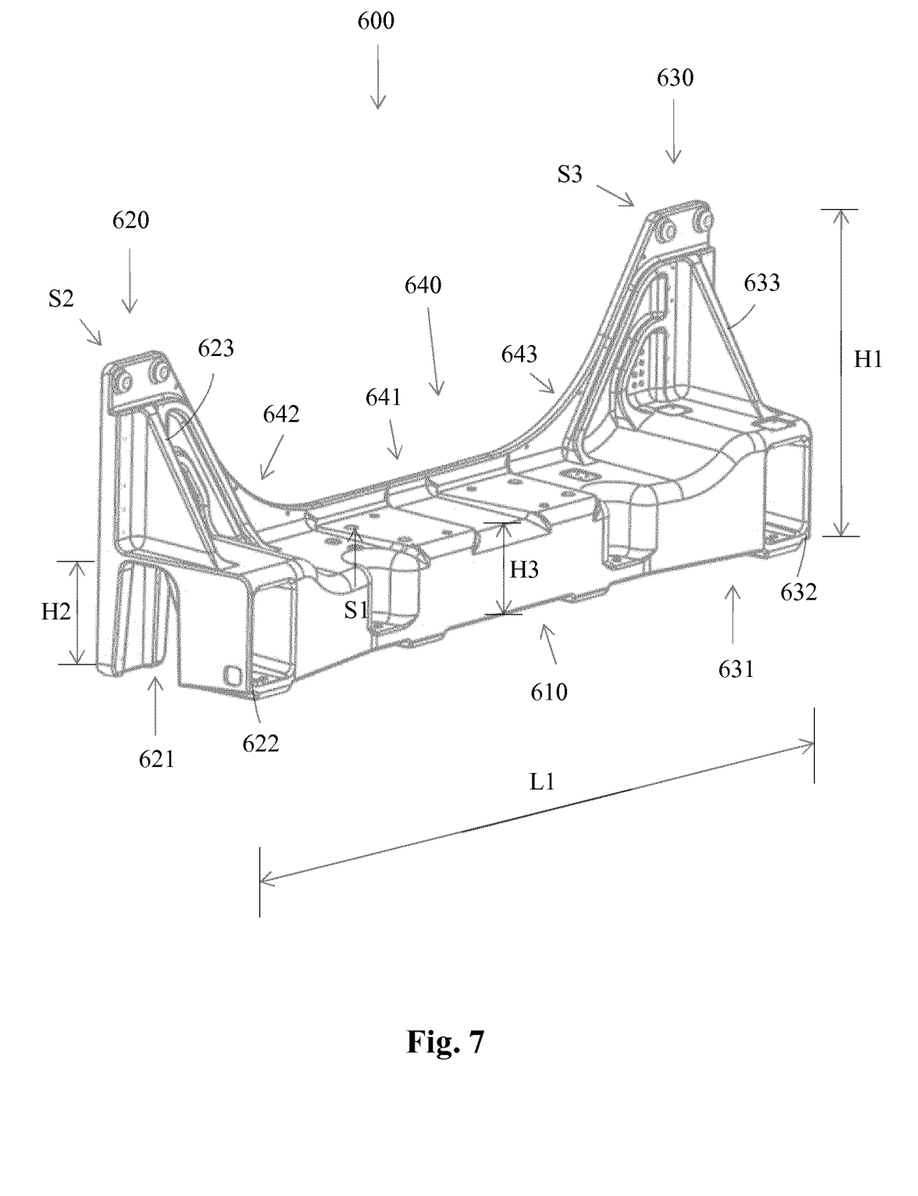
FIG. 7 shows an axonometric view of a second embodiment of an end support structure according to the invention.

FIG. 7 shows an axonometric view of a second embodiment of an end support structure according to the invention. The main difference is in the end portions 620, 630 in the end support structure 600. The middle portion 610 extends to both ends of the end support structure 600. The middle portion 610 has slightly higher portions at both ends forming the lower parts 622, 632 of the end portions 620, 630. The upper part of the end portions 620, 630 is formed of a triangular support 623, 633 supporting the second support surface S2, S3 at the lower part of the end portion 620, 630. The height H1 is in the range of 20 to 50% of the length L1 of the end support structure 600. The height H2 of the recess 621, 631 is in the range of 20 to 40% of the height H1 of the end portion 620, 630. The height H3 of the centre portion 610 of the end support structure 600 is in the range of 20 to 60% of the height H1 of the end portions 620, 630 of the end support structure 600.

Figure 8:
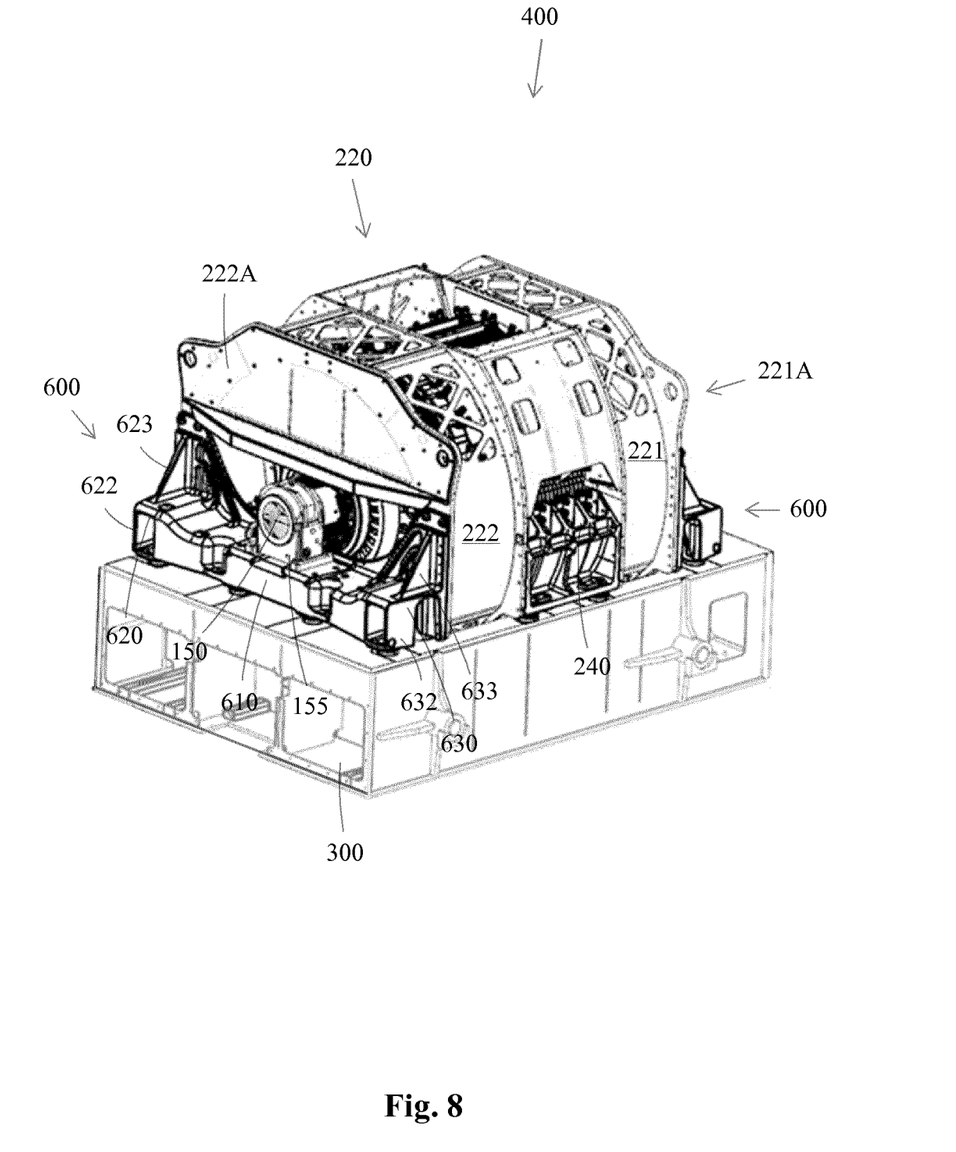
FIG. 8 shows an axonometric view of an electric machine with a support structure according to the invention.

FIG. 8 shows an axonometric view of an electric machine with a support structure according to the invention. The electric machine 400 is supported on the support structure 300. The end support structure 600 corresponds to the end support structure 600 shown in FIG. 7. The bearing housing 155 of the bearing 150 is supported on the middle portion 610 of the end support structure 600. The bearing housing 155 is attached with compression joints e.g. with bolts and nuts to the middle portion 610 of the end support structure 600. The first support surface S1 of the end support structure 600 is supported on the support structure 300. The end support structure 600 can be attached from the middle portion 610 and the end portions 620, 630 with compression joints e.g. with bolts and nuts to the support structure 300. The second support surfaces S2, S3 of the end portions 620, 630 of the end support structure 600 are supported on the end plate 222A of the end construction 222 of the stator frame 220. The end support structure 600 can be attached from the middle portion 610 and from the end portions 620, 630 with compression joints e.g. with bolts and nuts to the end plate 222A of the end construction 222 of the stator frame 220. The support points through which the end portions 620, 630 of the end support structure 600 are attached to the end plate 222A can be positioned on a higher level due to the height H1 of the end portions 620, 630. The end support structure 600 will thus increase the stiffness of the stator frame 220 considerably.

The frame plates 223 are formed of four sectors in the figures. The sectors 223 could naturally be expanded so that their edges attach each other forming a continuous annular frame plate 223 surrounding the stator core 210. The number of frame plates 223 between the end constructions 221, 222 could vary depending on the axial X-X length of the electric machine. The stator frame 220 could also be realized without frame plates 223. The stator frame 220 would only comprise the end constructions 221, 222, whereby the support elements 240 would be positioned directly between the end constructions 221, 222.

It will be obvious to a person skilled in the art that, as the technology advances, the inventive concept can be implemented in various ways. The invention and its embodiments are not limited to the examples described above but may vary within the scope of the claims.

The invention claimed is:

1. An electric machine comprises a cylindrical rotor being rotatable around a longitudinal centre axis (X-X) of rotation, a stator surrounding the rotor and a support structure supporting the rotor and the stator, the stator comprising a cylindrical stator core and a stator frame surrounding the stator core, the stator core being attached to the stator frame, the stator frame having axial (X-X) ends and longitudinal sides, the rotor being supported at each axial (X-X) end through a bearing located in a bearing house on the support structure the bearing house being located axially (X-X) outwardly from the axial (X-X) end of the stator frame, and an end support structure of cast iron having a length (L1) and a height (H1) is provided at each axial (X-X) end of the stator frame, the end support structure being formed of a longitudinal middle portion and two upwards to the height (H1) of the end support structure directed end portions, the end support structure extending in an axially (X-X) traverse direction (TD1) between the outer edges of the axial (X-X) ends of the stator frame, whereby the end support structure is attached with compression joints to the axial (X-X) end of the stator frame and to the support structure, the bearing house being supported on and attached to the middle portion of the end support structure.

2. The electric machine according to claim 1, wherein the height (H1) of the end portions of the end support structure is in the range of 20 to 50% of the length (L1) of the end support structure.

3. The electric machine according to claim 2, wherein each end portion of the end support structure comprises a recess extending from the bottom surface of the end portion upwards, whereby the stress concentration is reduced in the lower area of the end portion.

4. The electric machine according to claim 2, wherein transition sections between the middle portion and the end portions have a curved form, whereby the starting point of the cure at the middle portion is at a lower level compared to the end point of the curve at the end portion.

5. The electric machine according to claim 2, wherein the end support structure comprises a flange extending in the front edge of the support structure between the end portions of the end support structure, whereby the flange has a straight middle part and curved end parts starting from the upper ends of the end portions of the end support structure.

6. The electric machine according to claim 1, wherein each end portion of the end support structure comprises a recess extending from the bottom surface of the end portion upwards, whereby the stress concentration is reduced in the lower area of the end portion.

7. The electric machine according to claim 6, wherein transition sections between the middle portion and the end portions have a curved form, whereby the starting point of the cure at the middle portion is at a lower level compared to the end point of the curve at the end portion.

8. The electric machine according to claim 1, wherein transition sections between the middle portion and the end portions have a curved form, whereby the starting point of the cure at the middle portion is at a lower level compared to the end point of the curve at the end portion.

9. The electric machine according to claim 1, wherein the end support structure comprises a flange extending in the front edge of the support structure between the end portions of the end support structure, whereby the flange has a straight middle part and curved end parts starting from the upper ends of the end portions of the end support structure.

10. The electric machine according to claim 1, wherein the stator frame is attached from the longitudinal sides to the support structure.

11. The electric machine according to claim 10, wherein the stator frame is attached from the longitudinal sides with support elements to the support structure.

12. The electric machine according to claim 11, wherein the support elements are seated on side support surfaces of the support structure and the end support structures are seated on end support surfaces of the support structure.

13. The electric machine according to claim 12, wherein the side support surfaces and the end support surfaces are located on the same horizontal level.

14. The electric machine according to claim 12, wherein the side support surfaces are located at an angle ($\alpha 1$) in the range of 10 to 45 degrees below a horizontal centre plane (HC1-HC1) of the stator.

15. The electric machine according to claim 11, wherein the support elements and the frame plates in each of the sectors in the two lower corners of the stator frame are attached to each other in order to form a support element package, whereby each end of the support element package is attached with a compression joint to a respective end construction of the stator frame.

16. The electric machine according to claim 1, wherein the stator frame comprises two opposite end constructions located at an axial (X-X) distance from each other and at least one frame plate located between the end constructions.

17. The electric machine according to claim 16, wherein each frame plate is formed of four separate sectors so that two sectors of frame plates are located symmetrically in upper corners of the stator frame and two sectors of frame plates are located symmetrically in lower corners of the stator frame, whereby the frame plates in each of the sectors in the two upper corners of the stator frame are connected to each other with a connection part in order to form a first frame plate package.

18. The electric machine according to claim 17, wherein the stator frame is attached from the longitudinal sides with support elements to the support structure, the support structure and the frame plates in each of the sectors in the two lower corners of the stator frame are attached to each other in order to form a support element package, whereby each end of the support element package is attached with a compression joint to a respective end construction of the stator frame.

19. The electric machine according to claim 18, wherein the stator frame comprises further first intermediate parts located symmetrically in lowermost corners of the stator frame.

20. The electric machine according to claim 1, wherein the stator core is attached to the stator frame with L-shaped fastening brackets, whereby a first branch of the fastening bracket is attached with a compression joint to the back beam and a second branch of the fastening bracket is attached with a compression joint to a frame plate.

* * * * *